(12) United States Patent
Kawai et al.

(10) Patent No.: US 6,197,414 B1
(45) Date of Patent: Mar. 6, 2001

(54) FIBERBOARD AND MANUFACTURING METHOD THEREOF

(75) Inventors: Shuichi Kawai, Kyoto; Kenji Ohnishi, Osaka; Yuzo Okudaira, Hyogo-ken; Ryo Sugawara, Osaka; Takumi Ueda, Nara, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/129,942

(22) Filed: Aug. 6, 1998

(30) Foreign Application Priority Data

Dec. 25, 1997 (JP) .................................................. 9-357849
Mar. 27, 1998 (JP) ................................................ 10-081864

(51) Int. Cl.[7] ............................ B32B 27/04; B32B 27/12
(52) U.S. Cl. .................................... 428/297.4; 428/292.4; 428/298.1; 428/300.7; 428/301.4; 428/537.1
(58) Field of Search ........................... 428/292.4, 297.4, 428/298.1, 298.7, 300.1, 300.7, 301.4, 375, 378, 537.1

(56) References Cited

U.S. PATENT DOCUMENTS

| Re. 30,636 | * | 6/1981 | Barnes ................................. 428/294 |
| 2,429,235 | * | 10/1947 | Miskelly et al. ..................... 154/54.9 |
| 3,447,996 | * | 6/1969 | Himmmelheber et al. ............ 161/55 |
| 4,061,819 | * | 12/1977 | Barnes ................................. 428/294 |
| 4,968,549 | * | 11/1990 | Smimizu et al. ..................... 428/106 |
| 5,217,776 | * | 6/1993 | Tilby ..................................... 428/61 |
| 5,422,170 | * | 6/1995 | Iwata et al. ........................... 428/218 |
| 5,456,964 | * | 10/1995 | Tamura et al. ....................... 428/105 |
| 5,492,756 | | 2/1996 | Seale et al. . |
| 5,705,001 | * | 1/1998 | Iwata et al. ........................... 156/622 |
| 5,723,226 | * | 3/1998 | Francis et al. ....................... 428/688 |
| 5,834,105 | * | 11/1998 | White et al. ....................... 428/297.4 |
| 5,939,209 | * | 8/1999 | Shibuya et al. ..................... 428/532 |

FOREIGN PATENT DOCUMENTS

| 4218444A1 | 12/1993 | (DE) . |
| 69300001T2 | 9/1994 | (DE) . |
| 4417836C2 | 3/1996 | (DE) . |
| 4430937A1 | 3/1996 | (DE) . |
| 195 18 170C1 | 5/1996 | (DE) . |
| 195 17 763A1 | 11/1996 | (DE) . |
| 196 16 892A1 | 11/1996 | (DE) . |
| 6-285819A | 10/1994 | (JP) . |
| 6-322939A | 11/1994 | (JP) . |
| 8-336816A | 12/1996 | (JP) . |
| 9-094811A | 4/1997 | (JP) . |
| 9-094887A | 4/1997 | (JP) . |

OTHER PUBLICATIONS

Tappi Journal 80, Characterization of Kenaf Fiber Bundles and their Nonwoven Mats, (1997) 162–166.

* cited by examiner

Primary Examiner—William Krynski
Assistant Examiner—B. Shewareged
(74) Attorney, Agent, or Firm—Birch, Stewart, Kolasch & Birch, LLP

(57) ABSTRACT

The invention provides a fiberboard, as well as its manufacturing method, which comprises lignocellulose long fibers with a fiber length 50 mm or more and resin. The fiberboard of the invention has high mechanical strength and superior dimensional stability. Since lignocellulose-base materials of long fibers are utilized, the fiberboard can save the consumption of precious wood resources.

10 Claims, 6 Drawing Sheets

FIBERBOARD AND MANUFACTURING METHOD THEREOF

BACKGROUND OF THE INVENTION

1. Field of the Invention

The present invention relates to fiberboards and manufacturing methods therefor.

2. Description of the Prior Art

It is quite a difficult problem to ensure a stable supply of plywood for a long time to come.

In recent years, in association with environmental problems such as global warming and desertification, there has been a tendency that regulations against deforestation are tightened principally for tropical rain forests. On this account, in place of plywood made primarily of round timber, more attention has been paid to particle boards, strand boards, medium density fiberboards or other wood-based boards which employ wood particles or wood fibers as their material.

These boards are produced by mixing wood particles or wood fibers with adhesive and then hot-pressing the mixture. Unlike plywood, round timber of large-diameter are not necessarily involved in those boards and small-diameter woods may be used therefor. Besides, in some cases, miscellaneous trees, woodwork trash, waste woods, defective woods and the like can be utilized, so that those boards have an advantage that effective use of raw material can be made.

Among others, medium densitiy fiberboards are fiberboards produced by board-making fine fibers obtained from wood, so that the medium density fiberboard is superior in processibility and surface smoothness. Moreover, in terms of cost, medium density fiberboards are lower in price than plywood. Thus, medium density fiberboards have begun to be used in a wider range of fields typified by furniture or the like.

Wood fibers to be used for medium density fiberboards are obtained by processing small particles of softwood or hardwood into fibers having a length of, usually, 6 mm or less with a refiner, a defibrator or other defibrating machines. When surface smoothness or processibility is required, short fibers of 2 mm or less are frequently used.

The strength of a fiberboard depends on the strength of the fiber itself, intertwinement of fibers, strength of bonds between fibers and the like. For the existing medium density fiberboards, which use short fibers of a few mm or less, the intertwinement of fibers less contributes to the strength of the fiberboard, while the strength of the bonds between fibers contributes rather than the strength of the fiber itself makes a greater contribution.

Further, with fine fibers, numerous bonds between fibers are involved so that ordinary adhesive process could hardly achieve a strong bonding between many fibers. To enhance the strength of adhesion, one way would be to increase the amount of adhesive and thereby strengthen the bond between the fibers. In this case, however, large amounts of adhesive would be necessitated to attain a strong bond between fibers, hence being impractical in terms of cost. As a result, there is a limitation also in enhancing the strength of adhesion, so that the strength of the fiber itself is not reflected sufficiently. Consequently, medium density fiberboards are lower in mechanical strength than plywood.

Also, wood fibers which are a material of medium density fiberboards would vary in dimensions upon water absorption or moisture absorption. On this account, an medium density fiberboard formed from wood fibers would yield a dimensional change within a plane parallel to its surface upon water absorption or moisture absorption. Furthermore, since an medium density fiberboard has been strongly compressed thicknesswise during the pressing process, the medium density fiberboard would recover from the compression on account of water content, yielding a large expansion in thickness upon water absorption or moisture absorption. As a result, the medium density fiberboard is inferior also in dimensional stability to plywood.

Meanwhile, attempts have been started to utilize, as building materials, unused plant resources such as palm fibers which have been waste materials hitherto, instead of using the above wood resources. Such attempts are described in Japanese Patent Laid-Open Publication HEI 09-94811 (palm shell mat) and the like.

For building members utilizing unused plant resources, which are described in these prior arts, fibers obtained from unused plant resources are randomly arranged and intertwined so as to make up a mat form. Those building members are intended for use primarily as core material for tatami mats, cushioning material, heat insulating material and the like.

These mat-formed bodies, being low in density and having numerous voids inside, have such features as light weight and superiorities in air permeability, moisture permeability, cushioning property, sound absorbency, heat insulating property and the like. However, because of the fact that those bodies retain the strength depending mainly on only the intertwinement of fibers, as well as the fact that they have numerous voids inside, the mat-formed bodies are inferior in strength to plywood, medium density fiberboards and the like, thus inapplicable to building materials such as floor material, wall material and roof material.

As described above, there have been growing needs for fiberboards which are comparable with plywood in terms of fundamental performances of boards such as strength and dimensional stability, taking into consideration the viewpoints of global environmental problems and effective use of wood resources, and which are low priced in terms of cost.

SUMMARY OF THE INVENTION

An object of the invention is to provide a fiberboard, as well as its manufacturing method, which has high mechanical strength and dimensional stability.

A further object of the invention is to provide fiberboards which can save precious wood resources and which can lend themselves to a wide range of use as materials to be used for building members such as floor material, wall material and roof material, as materials to be used for furniture and the like, and as planar materials or framework materials.

The present invention relates to a fiberboard which comprises lignocellulose long fibers and resin, the lignocellulose long fibers having a fiber length of 6 mm or more.

DETAILED DESCRIPTION OF THE INVENTION

Figure 1:
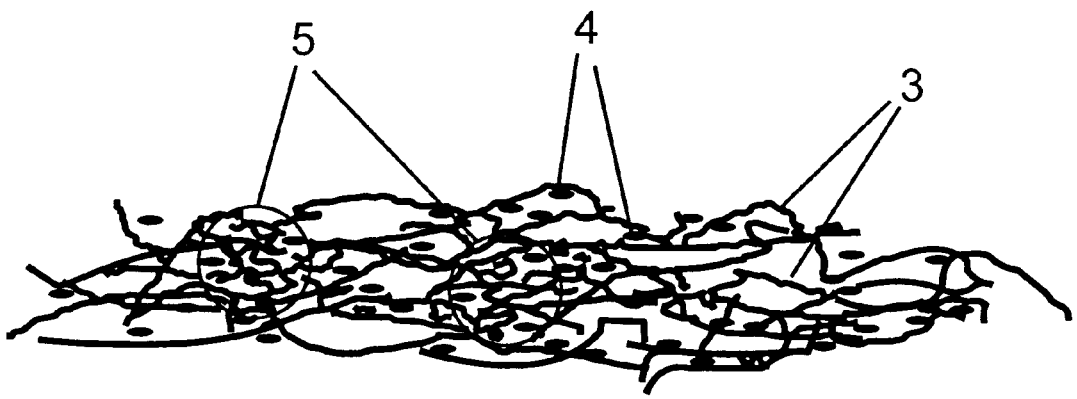
FIG. 1 is a partly enlarged view of cross-sectional part of a fiberboard containing lignocellulose long fiber according to the present invention.

The present invention provides a fiberboard which comprises lignocellulose long fibers and resin, the lignocellulose long fibers having a fiber length of 6 mm or more.

The kind of the lignocellulose long fiber for the fiberboard of the present invention is not particularly limited only if it is a lignocellulose fiber comprising cellulose and lignin as major constituents. Its examples include fibers obtained from palm, hemp, sugarcane, bamboo, rice plant, rice straw, wheat/barley straw, bagasse (stem of sugarcane), reed and the like. These fibers have scarcely been used as a material for fiberboards, resulting in wastes. Therefore, use of those fibers obtained from palm, hemp, sugarcane, bamboo, rice plant and the like affords advantages of not only reducing the wastes but also saving precious wood resources.

Also, if the lignocellulose long fiber is oil palm fiber, coconut palm fiber or kenaf fiber, it produces excellent effects for enhancement of the strength of the fiberboard because these fibers have as high strength about two to fourteen times as that of softwood fibers and hardwood fibers.

Oil palms are cultivated principally in Malaysia, Indonesia, the Philippines, and the like. The area of their cultivation has rapidly been increasing in recent years.

The fruit portion called empty fruit bunches (EFB) other than the fruit itself that is used for oil pressing from palms, the oil palm fronds, and the like are not utilized despite the fact that most of their constitution is fibrous components. Due to this, as the area of cultivation of oil palms increases, the amount of wastes has also been increasing.

The aforementioned empty fruit bunches and the fronds allow fibers to be easily obtained through physical shearing process by a hammer mill or the like. Because whole fruit bodies are gathered with the aim of harvesting fruits, the EFB fibers can be obtained relatively easily. Thus, empty fruit bunches and fronds are suitable as a material of fiberboards also in terms of cost.

Kenaf is a yearly plant belonging to the hemp, and cultivated principally in China, Southeast Asia and the like. The kenaf is utilized for nets, ropes and the like and has come to be used as raw material pulp for non-woody paper in recent years, but scarcely used as the material for fiberboards. By immersing kenaf in water, fibers can be easily obtained from the bast fiber part of the kenaf.

The length of the lignocellulose long fiber to be used in the fiberboard of the present invention is not particularly limited only if it is 6 mm or more, preferably 15 mm or more, more preferably 50 mm or more, even more preferably 90 mm or more. With the fiber length less than 6 mm, it would be difficult to obtain a high strength as a fiberboard. Short fibers of lignocellulose having less than 6 mm fiber lengths are usually straight shaped in its most part. Therefore, a fiberboard composed of only short fibers has less intertwinement of fibers inside so that the intertwinement less contributes to the strength of the fiberboard. Further, with short fibers used as the material of a fiberboard, more portions for bonding fibers one another are involved, so that the amount of adhesive at the bonds decreases. This would cause a limitation in enhancing the strength of the adhesion, so that the strength of the fiber material itself would not be utilized enough. As a result, any fiberboard composed of lignocellulose short fibers whose fiber length is less than 6 mm would be low in strength.

Also, when the fiber length is as long as 400 mm or more, there would arise problems of poorer manageability of fibers in the process of board formation, such as a difficulty in forming an aggregate of long fibers into a specified shape or a difficulty in dispersing the adhesive uniformly. Therefore, the fiber length of the lignocellulose fiber is preferably within 400 mm, preferably within 200 mm, more preferably within 170 mm, and even more preferably within 150 mm.

The length of fibers of oil palm EFB and fronds defibrated by a hammer mill is not less than 6 mm, and the length of coconut palm fibers and kenaf fibers is also not less than 6 mm, hence a longer fiber length as compared with softwood fibers and hardwood fibers which are used as the material of conventional medium density fiberboards. These oil palm fibers, coconut palm fibers and kenaf fibers can be easily cut into a length within a range of 6 mm–400 mm with simple means. These oil palm fibers, coconut palm fibers and kenaf fibers have diameters falling within a range of about 50 $\mu$m–1000 $\mu$m.

Based on the above facts, lignocellulose long fibers obtained from oil palm, coconut palm or kenaf are preferable because they allow long fibers to be easily obtained and they provide stable supply and high availability advantageously, and moreover because they are superior in enhancing the strength of the fiberboard.

Further, in addition to such lignocellulose long fibers described above, lignocellulose short fibers with fiber length 6 mm or less may be composited or mixed. By doing so, a fiberboard having high strength can be obtained.

A fiberboard fabricated by hot-pressing fibers in which lignocellulose short fibers with fiber length 6 mm or less and lignocellulose long fibers are composited or mixed together has a structure that intertwinement of long fibers are formed while short fibers are present in the vicinities of the intertwinements of long fibers.

Therefore, the intertwinement of long fibers is reinforced by the lignocellulose short fibers so that the strength of the fiberboard is enhanced. Also, when the ratio of lignocellulose short fibers is increased near the surface of the board, the surface smoothness is improved.

The kind of the lignocellulose short fibers to be composited or mixed with the lignocellulose long fibers can be exemplified by fibers obtained from softwood or hardwood. Any other lignocellulose fiber having a fiber length of 6 mm or less may be used without any particular limitation. However, fibers obtained from softwood such as Agathis, pines or other softwood, or fibers obtained from lauan, meranti, Japanese oak, Japanese beeches, gum trees or other hardwood give advantages of stable supply and high availability because these fibers are frequently used as a material of medium density fiberboards.

Also, the weight ratio of lignocellulose short fibers to be composited or mixed with lignocellulose long fibers, although not particularly limited if within such a range as will not loose the effect of use of lignocellulose long fibers, is desirably up to 2.0, preferably up to about 1.3 (by weight ratio) relative to lignocellulose long fibers taken as 1.

The fiberboard of the present invention is obtained by applying heat or pressure to an aggregate of fibers with resin dispersed therein to be board-made (generally, referred to as "hot-pressing").

The kind of resin to be used for the hot-pressing and the method for dispersing the resin are not particularly limited. However, the resin is preferably selected from those having adhesive property, generally from thermosetting resins which are cured by heating such as urea resins, melamine resins, phenol resins, resorcinol resins, epoxy resins, urethane resins, furfural resins and isocyanate resins.

The a mount of resin for use relative to the fibers, although set adequately, is up to a few %–30 wt % of the fiber weight, preferably up to 20 wt %, more preferably up to 15 wt %, even more preferably up to 10 wt %.

Also, the fiberboard of the present invention finally obtained, when required to have high mechanical strength, preferably has a density within a range of 0.3–1.0 g/cm$^3$ preferably 0.4–0.9 g/cm$^3$, more preferably 0.5–0.9 g/cm$^3$. If the fiberboard density is lower than 0.3 g/cm$^3$, the fiberboard would have numerous voids present inside the board, causing fiber-to-fiber bonded portions and intertwinements of fibers themselves to decrease, so that the strength of fiber-to-fiber bonded portions and the strength of intertwinements of fibers themselves would result in extremely lowered contribution to the strength of the fiberboard. Therefore, the fiberboard density, if lower than 0.3 g/cm$^3$, would result in considerably lowered mechanical strength.

As the press method used in the hot-pressing, batch type flat-plate press and continuous press methods are available, but the method is not particularly limited. The press temperature, press time, press pressure and the like in the hot-pressing process are set appropriately depending on the kind of the resin used, thickness of the fiberboard, and the like.

FIG. 1 shows an enlarged view of cross-sectional part of a fiberboard produced by hot-pressing an aggregate of lignocellulose long fibers having a fiber length of 6 mm or more according to the present invention. The fiberboard of the present invention is produced by dispersing adhesive 2 among 6 mm or longer lignocellulose long fibers 1 as the material, and then being hot-pressed. Because the length of the material lignocellulose long fibers 1 is 6 mm or more, the fiberboard is so structured as to have numerous intertwinements 3 of fibers in the interior of the fiberboard.

Generally, the strength of a fiberboard is determined by the strength of the fiber material itself, the intertwinement of fibers, the strength of bonds among the fibers and the like. Numerous intertwinements 5 of the fibers, if present in the interior of the fiberboard as shown in FIG. 1, lead to a greater contribution of the strength by intertwinements of fibers to the strength of the fiberboard. Further, employing 6 mm or more lignocellulose long fibers as the material allows the adhesive to be present at larger amount, at the bonds where the material fibers are coupled to one another. As a result, stronger adhesion between fibers can be obtained so that the strength of the bonds between the fibers is enhanced.

That is, greater contribution of the intertwinements of fibers to the strength of the fiberboard as well as enhanced strength of the bonds between fibers make it possible to take advantage of the strength of the fiber material itself into the strength of the fiberboard. Since the lignocellulose long fiber composed principally of cellulose and lignin is superior in the strength as a material, a fiberboard having high strength can be obtained resultantly.

Also, the lignocellulose long fiber has a feature that it is excellent in the strength along its fibrous direction. Therefore, aligning the fibers along a particular direction makes it possible to take advantage of the excellent strength in the fibrous direction, so that the strength of the fiberboard can be further enhanced.

Figure 2:
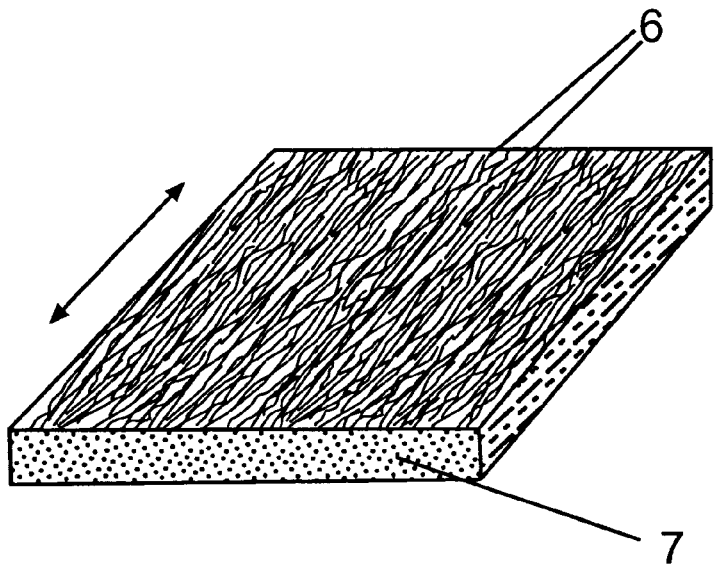
FIG. 2 is a schematic view of a fiberboard in which lignocellulose long fibers are oriented along one direction.

An example of this is the structure of a fiberboard 7 in which lignocellulose long fibers 6 are oriented generally along one direction as shown in FIG. 2. In FIG. 2, the lignocellulose long fibers 6 are oriented along the direction of the arrow.

The fiberboard of the present invention as shown in FIG. 2, in which the fibers are oriented generally along particular one direction, can take advantage of the excellent strength of the lignocellulose long fiber in its fibrous direction. Therefore, a fiberboard having extremely high strength in the direction of orientation of fibers can be obtained.

The state that lignocellulose long fibers are oriented means for the fiberboard of the present invention that the lignocellulose long fibers are oriented generally along particular one direction.

When the direction of orientation of long fibers is coincident with one direction, a highest effect of enhancing the strength of the fiberboard can be obtained. However, it is quite difficult to make all the directions of orientation of 6 mm or more lignocellulose long fibers coincident with one another. Also, a 6 mm or more fiber length of the lignocellulose long fibers to be oriented in one direction is effective in enhancing the strength of the fiberboard by the orientation of fibers. This effectiveness is described below with reference to the accompanying drawings.

Figure 3A:
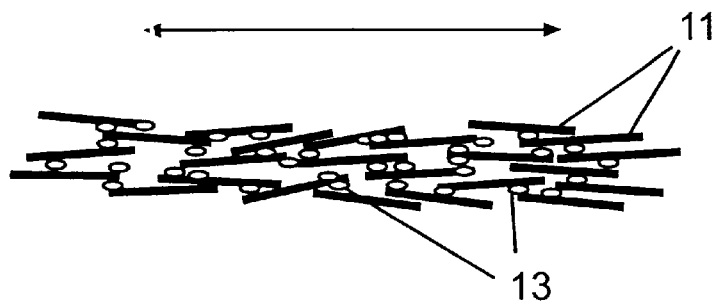
FIG. 3 is an explanatory view for comparison of oriented state of fibers having different length.
Figure 3B:
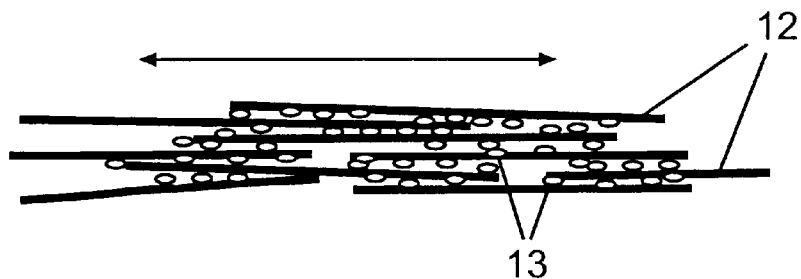

FIG. 3 is a conceptual view of the state of orientation of fibers with different lengths for comparison. FIG. 3-a represents a state of orientation of fibers where short fibers 11 are oriented. FIG. 3-b represents a state of orientation of fibers where long fibers 12 are oriented, showing that numerous bonds 13 at which the fibers are coupled with one another are present.

FIG. 3-a includes less portions at which the oriented short fibers 11 are bonded with one another. On the other hand, when the long fibers 12 are oriented, more bonds 13 between the long fibers 12 are present as shown in FIG. 3-b. That is, bonding force between fibers is stronger when long fibers are oriented than when short fibers are oriented. Accordingly, orienting long fibers allows better use of the strength of the fiber material, which leads to a greater contribution of the fiber material to the strength of the whole fiberboard. This means that effective use of the strength of the long fiber material can be made to enhance the strength the whole fiberboard. Because the lignocellulose long fiber is superior in the strength in the fibrous direction as described before, a fiberboard having extremely high strength can be obtained.

Further, the lignocellulose fiber is characterized by a very small rate of change of the length in the fibrous direction during water and moisture absorption. Therefore, when the fibers are oriented along one direction, a fiberboard superior in dimensional stability in the direction of orientation of the fibers during water absorption or moisture absorption can be obtained.

The fiberboard of the present invention, in which 6 mm or more lignocellulose long fibers are oriented, has extremely excellent strength and high dimensional stability in the direction of orientation of the fibers.

Figure 4:
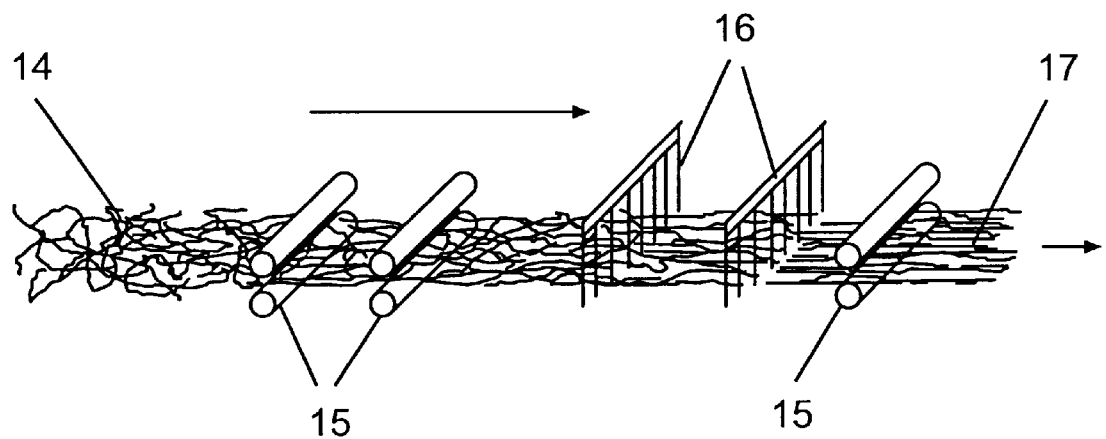
FIG. 4 is a schematic view representing the method for orienting fibers.

The method for orienting the fibers in the present invention is not limited particularly. For example, the method may be one which uses orienting equipment comprising in combination drawing part 15 composed of a plurality of roller pairs and comb-like combing part 16 as shown in FIG. 4. Intertwined long fibers 14 are passed through the drawing part 15 and the combing part 16, thus forming an aggregate 17 of fibers oriented along one direction. Aggregates 17 of oriented long fibers are laminated as required, and then hot-pressed, by which a fiberboard in which long fibers have been oriented is obtained.

The fiberboard is suitable for use as framework materials which are required to have uniaxial strength and dimensional stability in particular, such as column materials and beam materials. Also, when the fiberboard is bonded together with a planar material such as floor material, the mechanical strength of the planar material is reinforced in the direction of orientation of the fibers so that the fiberboard can be used as a reinforcing material for suppressing dimensional changes during water absorption or moisture absorption.

Also, a fiberboard in which lignocellulose long fibers are oriented in two directions generally perpendicular to each other comes with extremely high strength in the two directions in which the fibers are oriented, so that a fiberboard with less anisotropy of strength can be obtained. Besides, the dimensional stability in the perpendicular two directions is also improved.

Figure 5:
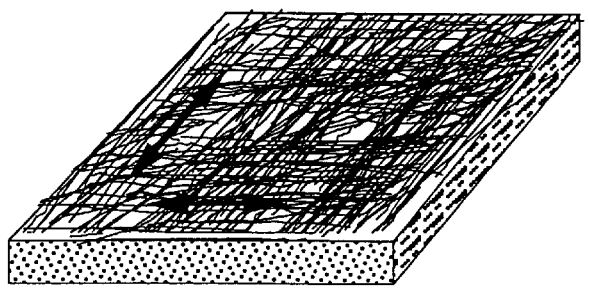
FIG. 5 is a schematic view of a fiberboard in which lignocellulose long fibers are oriented along generally perpendicular directions.

Accordingly, a fiberboard in which lignocellulose long fibers are oriented in generally perpendicular two directions is suitable for use as planar materials such as floor material, wall material and roof material. Also, when the fiberboard is bonded together with a planar material such as floor material, the strength of the planar material is enhanced so that the fiberboard can be used as a reinforcing material for suppressing dimensional changes. A schematic view of a fiberboard with the orientation in perpendicular two directions is shown in FIG. 5.

The fiberboard characterized in that lignocellulose long fibers are twined therein is reinforced in the intertwinement of fibers as well as in the strength of bonds between the fibers by virtue of the twining of the long fibers. This allows better use of the strength of the fiber material to be made. Since the lignocellulose long fiber has superior strength as described before, a fiberboard in which lignocellulose long fibers are twined has less anisotropy of strength and so high strength. Furthermore, enhanced bonding force between fibers themselves helps to suppress dimensional changes of fibers during water absorption or moisture absorption. Thus, there can be obtained a fiberboard exhibiting small dimensional changes along in-plane directions of the fiberboard in which long fibers have been twined, and so being excellent in dimensional stability. The terms, dimensional changes along in-plane directions, for the present invention refer to dimensional changes in any plane parallel to the fiberboard surface in a fiberboard formed into a board shape.

Figure 6:
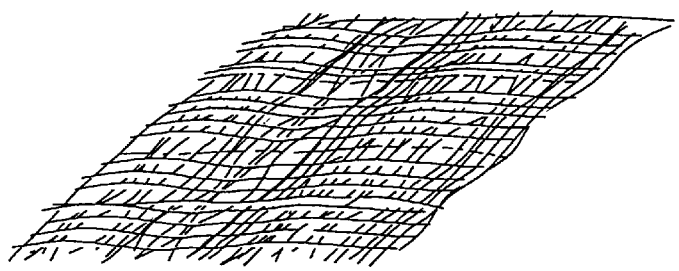
FIG. 6 is a schematic view of a sheet in which lignocellulose long fibers are twined.

For the fiberboard of the present invention, whereas the twining method is not limitative, the equipment as shown in FIG. 4 may be used as an example. After bundles of long fibers oriented in one direction are formed, they can be spun into a yarn-like form, twined up so as to be formed into a sheet shape. The shape of the sheet in which lignocellulose long fibers have been twined may be, for example, as shown in FIG. 6.

Figure 7:
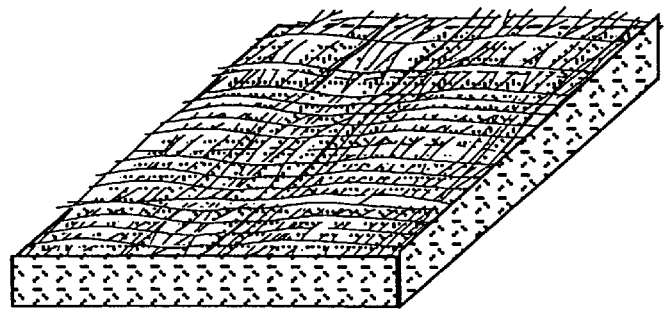
FIG. 7 is a schematic view of a fiberboard in which lignocellulose long fibers are twined.

After such twined sheets are laminated as required, they can be hot-pressed to give a fiberboard in which lignocellulose long fibers have been twined. A schematic view of a fiberboard resulting from the hot-pressing of the sheets in which long fibers have been twined is shown in FIG. 7.

Also, a fiberboard in which at least one layer among the layers constituting a multilayered fiberboard is formed from lignocellulose long fibers has high strength. That is, lamination of a layer formed of lignocellulose long fibers enhances the strength of the fiberboard having a multilayered structure.

The fiberboard of the present invention has at least one layer formed from 6 mm or more lignocellulose long fibers. The 6 mm or more length of lignocellulose long fibers makes it possible to obtain a fiberboard of high strength by the effect of the intertwinement of fibers. For the fiberboard of the present invention, layers other than the layer formed from lignocellulose long fibers are not limitative, and may be selected optionally depending on performances required of the fiberboard.

If at least one layer among the layers constituting a multilayered fiberboard is a layer in which lignocellulose long fibers are oriented along one direction, the fiberboard is superior in the strength in the direction of orientation of fibers and improved in dimensional stability in the direction of orientation of fibers.

Figure 8:
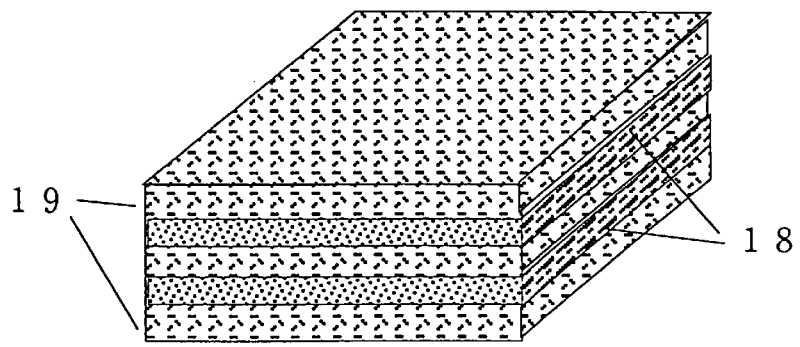
FIG. 8 is a schematic view of a multilayered fiberboard having inner layers in which lignocellulose long fibers are oriented along one direction.

FIG. 8 shows a schematic view of a fiberboard having a structure that five layers are laminated. The fiberboard shown in FIG. 8 has a structure that layers 18 in which lignocellulose long fibers are oriented along one direction are laminated so as to be adjacent to surface layers 19. Layers other than the layers in which long fibers are oriented along one direction are not particularly limited, and may be selected optionally depending on the performances required of the fiberboard.

Figure 9:
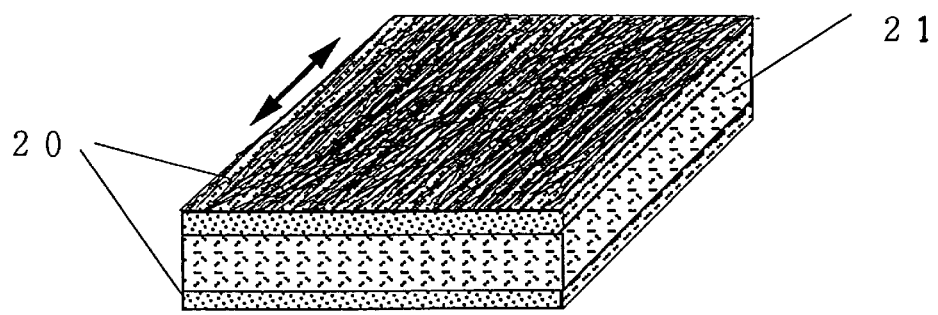
FIG. 9 is a schematic view of a fiberboard having surface layers in which lignocellulose long fibers are oriented along one direction.

Also, if the fiberboard has a multilayered structure and if its surface layer is formed of a layer in which lignocellulose long fibers are oriented along one direction, then the strength of the fiberboard is enhanced by the strength of the layer in which the lignocellulose long fibers are oriented, because of the tendency that the strength of a fiberboard depends most on the strength of the surface layer rather than on inner layers. As a result, the strength of the fiberboard in the direction of orientation of fibers in the surface layer is enhanced. Further, the dimensional stability of the fiberboard in the direction of orientation of fibers during water absorption or moisture absorption is improved. The fiberboard is suitable for use as framework materials, such as column material and beam material, which are required to have strength in a uniaxial direction in particular. FIG. 9 outlines a fiberboard having a three-layer structure and comprising surface layers 20 in which lignocellulose long fibers are oriented along one direction, and an inner layer 21. For the fiberboard of the present invention, the inner layer 21 other than the surface layers 20 in which long fibers are oriented along one direction is not particularly limited, and may be selected optionally depending on the performances required of the fiberboard.

Also, if the surface layer is formed of a layer in which lignocellulose long fibers are oriented in generally perpendicular two directions, then the strength of the fiberboard in the two directions of orientation is enhanced because of the tendency that the strength of a fiberboard having a multi-layered structure depends most on the strength of the surface layer. As a result, a fiberboard superior in strength and small in anisotropy of strength can be obtained. Furthermore, the dimensional stability of the fiberboard in generally perpendicular two directions is also improved. The fiberboard is suitable for use as planar materials such as floor material, wall material and roof material.

Figure 10:
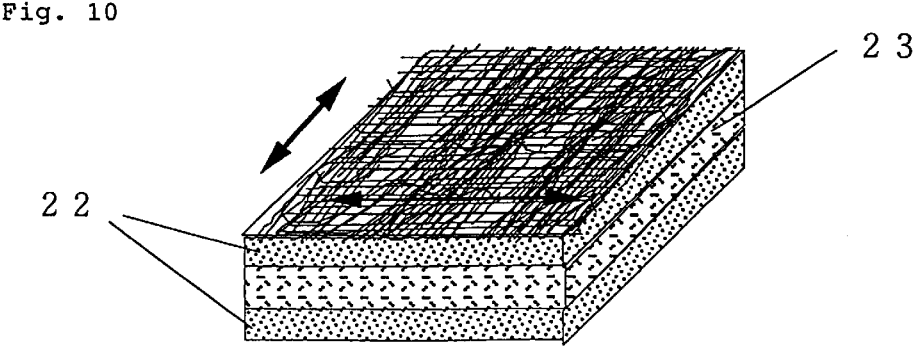
FIG. 10 is a schematic view of a fiberboard having surface layers in which lignocellulose long fibers are oriented in two directions.

FIG. 10 outlines a fiberboard having a three-layer structure and comprising surface layers 22 and an inner layer 23. In FIG. 10, the surface layers 22 have lignocellulose long fibers oriented in perpendicular two directions. For the fiberboard of the present invention, the inner layer 23 other than the surface layers 22 in which long fibers are oriented in perpendicular two directions is not particularly limited, and may be selected optionally depending on the performances required of the fiberboard.

Also, there is a tendency that the strength of a multilayered fiberboard depends on the strength of surface layers and the adhesion strength of layers adjacent to the surface layers. As described before, the strength of the surface layers is enhanced by the strength of lignocellulose long fibers. The adhesion strength of the layers adjacent to the surface layers is largely affected also by the shape of their boundary surface. By laminating layers so that their boundary surface becomes a curved surface, the adhesion area increases. As a result, the adhesion strength between surface layer and inner layer is enhanced. The enhanced adhesion strength in turn enhances the strength of the fiberboard, so that the dimensional stability in the direction of fibers during water absorption or moisture absorption is improved.

Figure 11:
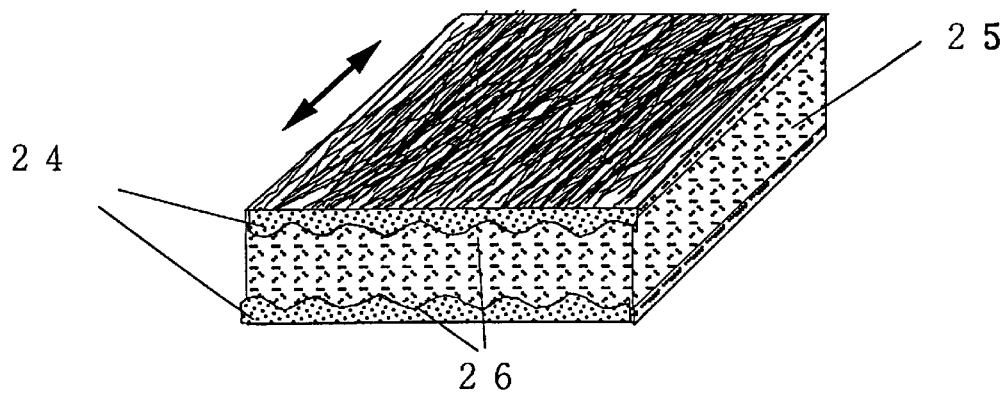
FIG. 11 is a schematic view of a fiberboard which is hot-pressed so that the boundary surface between a surface layer and its adjacent layer becomes a curved surface.

FIG. 11 outlines a fiberboard in which layers are laminated so that boundary surfaces 26 between surface layers 24 in which lignocellulose long fibers are oriented along one direction and an inner layer 25 adjacent to the surface layers 24 become curved surfaces.

In a structure of the fiberboard in which a plurality of layers having lignocellulose long fibers oriented along one direction are laminated, if at least one direction among the directions in which fibers are oriented in the individual layers is different from the others, the strength in the direction of orientation of the fibers is enhanced so that the strength in the plurality of directions of orientation is enhanced. In addition, the dimensional stability in the plurality of directions of orientation is also improved. In particular, if the directions of orientation of fibers in adjacent layers are perpendicular to each other, anisotropy as to the strength and dimensional stability in the perpendicular two directions becomes extremely small, so that the fiberboard is suitable for use as planar materials such as floor material, wall material and roof material. The number of laminated layers and the thickness of the laminated layers are set as required, and not particularly limited. A multilayered fiberboard of nine layers formed so that adjacent layers 27 have perpendicular directions of orientation of fibers is outlined in FIG. 12, and a multilayered fiberboard of three layers formed so that adjacent layers 28 have perpendicular directions of orientation of fibers is outlined in FIG. 13.

Also, when a fiberboard in which lignocellulose long fibers are oriented or twined in one direction or perpendicular directions and an inorganic fiberboard are laminated, there can be obtained a fiberboard superior in strength, compared with an inorganic fiberboard.

The inorganic fiberboard generally has an advantage of being superior in dimensional stability because of its extremely small dimensional change of fibers due to moisture, but has had a drawback of inferior strength characteristis.

Therefore, in addition to the superior dimensional stability of the inorganic fiberboard, an effect of improvement in the strength due to the orientation or twining of lignocellulose long fibers in one direction or perpendicular directions can be expected, so that a fiberboard superior in strength and dimensional stability can be obtained.

The kind of fibers constituting the inorganic fiberboard may be glass wool fiber, rock wool fiber, calcium silicate fiber and the like without any particular limitation.

Because the fiberboard is obtained by hot-pressing, internal stress remains particularly in the thicknesswise direction. Due to this, under the conditions of water absorption and moisture absorption, there would occur dimensional changes of compressed fibers with decreasing adhesion, which in turn would cause a thickness expansion of the fiberboard. The thickness expansion is affected largely by the compression ratio, i.e., the density of the fiberboard after hot-pressed. Therefore, a means for improving the dimensional stability in the thicknesswise direction may be implemented by reducing the compression ratio and thereby lowering the density. However, merely lowering the density of the fiberboard would result in a largely deteriorated performance in terms of strength.

To solve this problem, providing such a constitution that the density of the fiberboard is lower in central part than in the vicinities of the surfaces of the fiberboard allows the strength of the fiberboard to be maintained even if the density is lower in the central part of the fiberboard than in the vicinities of the surfaces, because the strength of the fiberboard depends on the strength of the vicinities of the surfaces more than on the central part of the fiberboard.

Moreover, the fiberboard of the present invention is enhanced in its strength by being made from lignocellulose long fibers as the material, so that even if the central part of the fiberboard is lowered in density, a high strength as a fiberboard can be maintained. That is, lowering the density of the central part of the fiberboard allows the weight to be reduced with the high strength maintained, while the dimensional stability in the thicknesswise direction can be improved by the lowered density of the central part of the fiberboard. As a result, a fiberboard which is light in weight, high in strength and moreover superior in the dimensional stability in the thicknesswise direction can be obtained. The fiberboard is suitable for use as planar materials such as floor material, wall material and roof material.

As the form of the fiberboard in which the density is lowered toward a direction from near the fiberboard surfaces to central part of the fiberboard, available are multilayered fiberboards in which the surface layer comprising lignocellulose long fibers is enhanced in density, or multilayered fiberboards in which the density is enhanced in the layers having lignocellulose long fibers oriented as shown in FIGS. 9 and 10. In this case, those in which the density of the surface layer part is enhanced can afford higher strength as a fiberboard. In this fiberboard, if the density of surface layers serving as the surface part is 0.4–1.2 g/cm$^3$, the density of the interior of the fiberboard is 0.2–0.8 g/cm$^3$ and if the overall density is 0.3–1.0 g/cm$^3$, then an improvement effect of the strength by the surface layers as well as an improvement effect of the dimensional stability by a lowered density of the inner layers can be obtained. The weight ratio of surface layers to inner layers is set as required, depending on the required strength and dimensional stability.

The form of the fiberboard in which the density is lowered toward a direction from near the fiberboard surfaces to the central part of the fiberboard is not limited to the above stacky structure. It is also possible to select a state of orientation of lignocellulose long fibers, a weight constituent ratio of long fibers and a composite form as required, where an optimum design in accordance with aimed performances is enabled.

If a bundle of fibers formed by orienting lignocellulose long fibers along one direction is arranged inside the continuous phase of the fiberboard, then the strength of the fiberboard can be enhanced by the strength of the bundle of fibers oriented along one direction. Therefore, the fiberboard is superior in the strength in the direction of orientation of fibers, and moreover the dimensional stability in the direction of orientation of fibers is improved.

Figure 14:
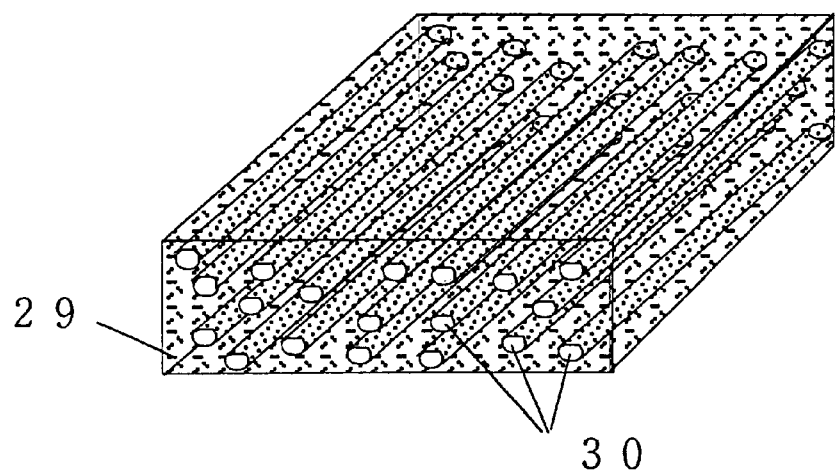
FIG. 14 is a schematic view of a fiberboard in which aggregates of fibers with lignocellulose long fibers oriented along one direction are arranged in the inside of the fiberboard.

As a composite structure, there can be mentioned a form of fiberboard as shown in FIG. 14, as an example, where fiber bundles 30 in which lignocellulose long fibers are oriented along one direction are independently present and composited inside a continuous phase 29 of the fiberboard. The kind of fibers contained in the continuous phase constituting such a fiberboard is exemplified by lignocellulose fibers having a 6 mm or less fiber length such as softwood fibers and hardwood fibers, but is not particularly limited. The weight ratio of the fiber bundles in which lignocellulose long fibers are oriented along one direction is not particularly limited.

Although the method for manufacturing the multilayered fiberboard is not particularly limited, it is preferable to laminate layers and then form them into a board shape by applying heat, pressure or the like, in which case the adhesion property between the layers is enhanced so that a fiberboard superior in strength and improved in dimensional stability can be obtained.

It is also preferable that layers individually board-made by heat, pressure or the like are laminated and then bonded together, in which case thickness and density of each layer can be controlled with precision so that a fiberboard superior in strength and improved in dimensional stability can be obtained.

Hereinbelow, an embodiment of the fiberboard according to the present invention is described in detail.

EXAMPLE 1

After fibers obtained by defibrating oil palm EFB were cut into a length of 100 mm, 40.5 g of phenol-based powder adhesive was added and dispersed to 445.5 g of the fibers. The fibers were stacked in a 300 mm×300 mm frame. After the frame was removed, the fibers were hot-pressed with a 9 mm distance bar pinched between hot plates. The conditions for this process were a press temperature of 160° C., a press pressure of 50 kg/cm$^2$ and a press time of 5 minutes. These conditions are shown in Tables 1–15. Physical properties of the resulting fiberboard were tested according to the method defined by JIS A5906 (medium density fiberboard) and JIS A1437 (Resistance-to-Moisture B Method in Moisture Resistance Test Method for Building Interior Boards). Test results are shown in Table 2. In Table 2, the lengthwise rate of change during moisture absorption and the widthwise rate of change during moisture absorption are after-7-day lengthwise and widthwise rates of change, respectively, of the fiberboard placed in a thermo-hygrostat set to 40° C. temperature and 90% humidity.

EXAMPLE 2

After fibers obtained by defibrating fruit portion of coconut palms were cut into a length of 100 mm, 81 g of a 50% aqueous dispersion of isocyanate-based adhesive was added and dispersed to 445.5 g of the fibers. Then the fibers were hot-pressed and tested in a manner similar to Example 1. Preparation conditions are shown in Tables 1–15 and test results are shown in Table 2.

EXAMPLE 3

After fibers obtained by defibrating oil palm EFB were cut into a length of 10 mm, 81 g of a 50% aqueous dispersion of a combination of 100 parts of urea-melamine-based adhesive and 1 part of ammonium chloride hardner was dispersed to 445.5 g of the fibers. Then the fibers were hot-pressed and tested in a manner similar to Example 1. Preparation conditions are shown in Tables 1–15 and test results are shown in Table 2.

EXAMPLE 4

After fibers obtained by defibrating oil palm fronds were cut into a length of 100 mm, 198 g of the oil palm fronds fibers and 247.5 g of softwood fibers with mean fiber length 2 mm were mixed, and further 81 g of a 50% aqueous dispersion of a combination of 100 parts of urea-melamine-based adhesive and 1 part of ammonium chloride hardener was dispersed in the mixture. The dispersion was made so that the ratio of oil-palm frond fibers to softwood fibers would become 4:5. Then the fibers were hot-pressed and tested in a manner similar to Example 1. Preparation conditions are shown in Tables 1–15 and test results are shown in Table 2.

EXAMPLE 5

After fibers obtained by defibrating oil palm EFB were cut into a length of 100 mm, 40.5 g of phenol-based powder adhesive was added and dispersed to 445.5 g of the fibers. The fibers with the adhesive dispersed were oriented along one direction by using an orienting device which had in combination a drawing part comprising six roller pairs and a comb-like combing part, and then aligned in a single direction within a 300 mm×300 mm frame and laminated. The frame was removed. Then, with a 9 mm distance bar pinched between hot plates, the fibers were hot-pressed and tested in a manner similar to Example 1. Preparation conditions are shown in Tables 1–15 and test results are shown in Table 2. In Table 2, the lengthwise direction for the lengthwise rate of change during moisture absorption refers to a direction of orientation in which the fibers were aligned, and the widthwise direction for the widthwise rate of change during moisture absorption refers to a direction perpendicular to the direction of orientation in which the fibers were aligned.

EXAMPLE 6

After fibers obtained by defibrating kenaf were cut into a length of 150 mm, 108 g of a 50% aqueous dispersion of isocyanate-based adhesive was added and dispersed to 594 g of the fibers. The fibers with the adhesive dispersed were oriented along one direction by using an orienting device which had in combination a drawing part comprising six roller pairs and a comb-like combing part, and then aligned in a single direction within a 300 mm×300 mm frame and laminated. The frame was removed. Then, with a 9 mm distance bar pinched between hot plates, the fibers were hot-pressed and tested in a manner similar to Example 1. Preparation conditions are shown in Tables 1–15 and test results are shown in Table 2.

EXAMPLE 7

After fibers obtained by defibrating oil palm EFB were cut into a length of 10 mm, 54.0 g of phenol-based powder adhesive was added and dispersed to 594 g of the fibers. The fibers with the adhesive dispersed were oriented along one direction by using an orienting device which had in combination a drawing part comprising six roller pairs and a comb-like combing part, and then aligned in one direction and in a direction perpendicular to the one direction within a 300 mm×300 mm frame and laminated. The frame was removed. Then, with a 9 mm distance bar pinched between hot plates, the fibers were hot-pressed and tested as in Example 1. Preparation conditions are shown in Tables 1–15 and test results are shown in Table 2.

EXAMPLE 8

After fibers obtained by defibrating kenaf were cut into a length of 100 mm, 81 g of a 50% aqueous dispersion of isocyanate-based adhesive was added and dispersed to 445.5 g of the fibers. The fibers with the adhesive dispersed were oriented along one direction by using an orienting device which had in combination a drawing part comprising six roller pairs and a comb-like combing part, and then aligned in one direction and in a direction perpendicular to the one direction within a 300 mm×300 mm frame and laminated. The frame was removed. Then, with a 9 mm distance bar pinched between hot plates, the fibers were hot-pressed and tested in a manner similar to Example 1. Preparation conditions are shown in Tables 1–15 and test results are shown in Table 2.

EXAMPLE 9

After fibers obtained by defibrating oil palm EFB were cut into a length of 100 mm, 81 g of a 50% aqueous dispersion of a combination of 100 parts of urea-melamine-based adhesive and 1 part of ammonium chloride hardener was dispersed to 445.5 g of the fibers. The fibers with the adhesive dispersed were oriented along one direction by using an orienting device which had in combination a drawing part comprising six roller pairs and a comb-like combing part, and then spun into yarn with a drawing frame, which is a textile machine. Net-like twined bodies of the resulting yarn were aligned and laminated within a 300 mm×300 mm frame. The frame was removed. Then, with a 9 mm distance bar pinched between hot plates, the fibers were hot-pressed and tested as in Example 1. Preparation conditions are shown in Tables 1–15 and test results are shown in Table 2.

EXAMPLE 10

As a surface layer, after fibers obtained by defibrating fruit portion of coconut palms were cut into a length of 100 mm, 36 g of a 50% aqueous dispersion of isocyanate-based adhesive was added and dispersed to 198 g of the fibers. Also, as an inner layer, after fibers obtained by defibrating oil palm fronds were cut into a length of 100 mm, 110 g of oil-palm frond fibers and 137.5 g of softwood fibers with mean fiber length 2 mm were mixed, and 45 g of a 50% aqueous dispersion of isocyanate-based adhesive was added and dispersed to the mixture. A half of the fibers of fruit portion of coconut palms with the adhesive dispersed were laminated within a 300 mm×300 mm frame, and then the mixed fibers of oil-palm frond fibers and softwood fibers with the adhesive dispersed were added, and further the remaining half of the fibers of fruit portion of coconut palms were added and laminated. The frame was removed. Afterwards, with a 9 mm distance bar pinched between hot plates, the fibers were hot-pressed and tested in a manner similar to Example 1. The resulting thickness of the surface layer was 2 mm and the resulting thickness of the inner layer was 5 mm. Preparation conditions are shown in Tables 1–15 and test results are shown in Table 2.

EXAMPLE 11

As a surface layer, after fibers obtained by defibrating oil palm EFB were cut into a length of 100 mm, 18 g of phenol-based powder adhesive was added and dispersed to 198 g of the fibers. Also, as an inner layer, 22.5 g of phenol-based powder adhesive was added and dispersed to 247.5 g of softwood fibers with mean fiber length 2 mm. A half of the fibers of oil palm EFB with the adhesive dispersed were laminated within a 300 mm×300 mm frame, and then softwood fibers with the adhesive dispersed were added, and further the remaining half of the fibers of oil palm EFB were added and laminated. The frame was removed. Then, with a 9 mm distance bar pinched between hot plates, the fibers were hot-pressed and tested in a manner similar to Example 1. The resulting thickness of the surface layer was 2 mm and the resulting thickness of the inner layer was 5 mm. Preparation conditions are shown in Tables 1–15 and test results are shown in Table 2.

EXAMPLE 12

As a surface layer, after fibers obtained by defibrating oil palm fronds were cut into a length of 100 mm, 36 g of a 50% aqueous dispersion of a combination of 100 parts of urea-melamine-based adhesive and 1 part of ammonium chloride hardener was dispersed to 198 g of the fibers. Also, as an inner layer, 45 g of a 50% aqueous dispersion of a combination of 100 parts of urea-melamine-based adhesive and 1 part of ammonium chloride hardener was dispersed to 247.5 g of softwood fibers with mean fiber length 2 mm. A half of the oil palm fronds fibers with the adhesive dispersed were oriented along one direction by using an orienting device which had in combination a drawing part comprising six roller pairs and a comb-like combing part, and then aligned in a single direction within a 300 mm×300 mm frame and laminated. Then, softwood fibers with the adhesive dispersed were added, and further the remaining half of the oil palm fronds fibers were stretched and aligned along the same direction as with the first half, and laminated. The frame was removed. Afterwards, with a 9 mm distance bar pinched between hot plates, the fibers were hot-pressed and tested in a manner similar to Example 1. The resulting thickness of the surface layer was 2 mm and the resulting thickness of the inner layer was 5 mm. Preparation conditions are shown in Tables 1–15 and test results are shown in Table 2. In Table 2, the lengthwise direction for the lengthwise rate of change during moisture absorption is a direction of orientation in which the fibers were aligned within the surface layer, and the widthwise direction for the widthwise rate of change during moisture absorption is a direction perpendicular to the direction of orientation in which the fibers were aligned within the surface layer.

EXAMPLE 13

As a surface layer, after fibers obtained by defibrating kenaf were cut into a length of 150 mm, 24 g of phenol-based powder adhesive was added and dispersed to 264 g of the fibers. Also, as an inner layer, 30 g of phenol-based powder adhesive was added and dispersed to 330 g of short fibers of oil palm EFB whose mean fiber length was made into about 2 mm by a cutting mill. The kenaf fibers with the adhesive dispersed were oriented along one direction by using an orienting device which had in combination a drawing part comprising six roller pairs and a comb-like combing part. After a half of the fibers were aligned in a single direction and laminated within a 300 mm×300 mm frame, the oil palm EFB short fibers with the adhesive dispersed were added, and further the remaining half of the kenaf fibers were stretched and aligned along the same direction as with the first half, and laminated. The frame was removed. Afterwards, with a 9 mm distance bar pinched between hot plates, the fibers were hot-pressed and tested in a manner similar to Example 1. The resulting thickness of the surface layer was 2 mm and the resulting thickness of the inner layer was 5 mm. Preparation conditions are shown in Tables 1–15 and test results are shown in Table 2. In Table 2, the lengthwise direction for the lengthwise rate of change during moisture absorption refers to a direction of orientation in which the fibers were aligned within the surface layer, and the widthwise direction for the widthwise rate of change during moisture absorption refers to a direction perpendicular to the direction of orientation in which the fibers were aligned within the surface layer.

EXAMPLE 14

As a surface layer, after fibers obtained by defibrating fruit portion of coconut palms were cut into a length of 10 mm, 48 g of a 50% aqueous dispersion of isocyanate-based adhesive was added and dispersed to 264 g of the fibers. Also, as an inner layer, 60 g of a 50% aqueous dispersion of isocyanate-based adhesive was dispersed to 330 g of oil palm EFB short fibers whose mean fiber length was made into about 2 mm by a cutting mill. The coconut-palm fruit portion fibers with the adhesive dispersed were oriented along one direction by using an orienting device which had in combination a drawing part comprising six roller pairs and a comb-like combing part. Then, a half of the fibers were aligned an d laminated in one direction and in a direction-perpendicular to the one direction within a 300 mm×300 mm frame, the oil palm EFB short fibers with the adhesive dispersed were added, and further the remaining half of the coconut-palm fruit portion fibers were stretched and aligned in one direction and in a direction perpendicular to the one direction as in the first half, and laminated. The frame was removed. Afterwards, with a 9 mm distance bar pinched between hot plates, the fibers were hot-pressed and test ed in a manner similar to Example 1. The resulting thickness of the surface layer was 2 mm and the resulting thickness of the inner layer was 5 mm. Preparation conditions are shown in Tables 1–15 and test results are shown in Table 2.

EXAMPLE 15

As a surface layer, after fibers obtained by defibrating kenaf were cut into a length of 100 mm, 36 g of a 50% aqueous dispersion of isocyanate-based adhesive was added and dispersed to 198 g of the fibers. Also, as an inner layer, 45 g of a 50% aqueous dispersion of isocyanate-based adhesive was dispersed to 247.5 g of softwood fibers with mean fiber length about 2 mm. The kenaf fibers with the adhesive dispersed were oriented along one direction by using an orienting device which had in combination a drawing part comprising six roller pairs and a comb-like combing part. After a half of the fibers were aligned in one direction and in a direction perpendicular to the one direction and laminated within a 300 mm×300 mm frame, the softwood fibers with the adhesive dispersed were added, and further the remaining half of the kenaf fibers were stretched and aligned in one direction and in a direction perpendicular to the one direction as with the first half, and laminated. The frame was removed. Afterwards, with a 9 mm distance bar pinched between hot plates, the fibers were hot-pressed and tested in a manner similar to Example 1. The resulting thickness of the surface layer was 2 mm and the resulting thickness of the inner layer was 5 mm. Preparation conditions are shown in Tables 1–15 and test results are shown in Table 2.

EXAMPLE 16

As a surface layer, after fibers obtained by defibrating oil palm EFB were cut into a length of 100 mm, 36 g of a 50% aqueous dispersion of a combination of 100 parts of urea-melamine-based adhesive and 1 part of ammonium chloride hardener was dispersed to 198 g of the fibers. Also, as an inner layer, 45 g of a 50% aqueous dispersion of a combination of 100 parts of urea-melamine-based adhesive and 1 part of ammonium chloride hardener was dispersed to 247.5 g of softwood fibers with mean fiber length 2 mm. The oil palm EFB fibers with the adhesive dispersed were oriented along one direction by using an orienting device which had in combination a drawing part comprising six roller pairs and a comb-like combing part, and then spun into yarn with a drawing frame, which is a textile machine. A half of net-like twined bodies of the resulting yarn were aligned and laminated within a 300 mm×300 mm frame, the softwood fibers with the adhesive dispersed were added, and further the remaining half of the net-like twined bodies of oil palm EFB fibers were aligned and laminated. The frame was removed. Afterwards, with a 9 mm distance bar pinched between hot plates, the fibers were hot-pressed and tested in a manner similar to Example 1. The resulting thickness of the surface layer was 2 mm and the resulting thickness of the inner layer was 5 mm. Preparation conditions are shown in Tables 1–15 and test results are shown in Table 2.

EXAMPLE 17

As a surface layer, after fibers obtained by defibrating kenaf were cut into a length of 100 mm, 18 g of phenol-based powder adhesive was added and dispersed to 198 g of the fibers. The kenaf fibers with the adhesive dispersed were oriented along one direction by using an orienting device which had in combination a drawing part comprising six roller pairs and a comb-like combing part, and then a half of the fibers were aligned in one direction and in a direction perpendicular to the one direction and laminated within a 300 mm×300 mm frame. Afterwards, as an inner layer, a phenol-reinforced rock wool board (product name: Tough Flex Board having a size of 300 mm×300 mm×9 mm thick, a 0.40 g/cm$^3$ density and a 180 g weight was superposed, and further the remaining half of the kenaf fibers were stretched and aligned in one direction and in a direction perpendicular to the one direction as in the first half, and laminated. The frame was removed. Afterwards, with a 9 mm distance bar pinched between hot plates, the fibers were hot-pressed and tested in a manner similar to Example 1. Preparation conditions are shown in Tables 1–15 and test results are shown in Table 2.

EXAMPLE 18

After fibers obtained by defibrating oil palm fronds were cut into a length of 100 mm, 40.5 g of phenol-based powder adhesive was added and dispersed to 445.5 g of the fibers. The fibers were oriented along one direction by using an orienting device which had in combination a drawing part comprising six roller pairs and a comb-like combing part. After that, a 54 g portion, which was one of equally divided nine portions of the material, was aligned in a single direction within a 300 mm×300 mm frame and laminated, and then the next 54 g portion was aligned in a direction perpendicular to the direction of orientation of the first 54 g portion. By repeating this step, the fibers were laminated into nine layers. The frame was removed. Then, with a 9 mm distance bar pinched between hot plates, the fibers were hot-pressed and tested as in Example 1. The thickness of resulting each layer was 1 mm. Preparation conditions are shown in Tables 1–15 and test results are shown in Table 2.

EXAMPLE 19

After fibers obtained by defibrating kenaf were cut into a length of 100 mm, 81 g of a 50% aqueous dispersion of isocyanate-based adhesive was added and dispersed to 445.5 g of the fibers. The fibers were oriented along one direction by using an orienting device which had in combination a drawing part comprising six roller pairs and a comb-like combing part. After that, a 58.5 g portion, which was one of equally divided nine portions of the material, was aligned in a single direction within a 300 mm×300 mm frame and laminated, and then the next 58.5 g portion was aligned in a direction perpendicular to the direction of orientation of the first 58.5 g portion. By repeating this step, the fibers were laminated into nine layers. The frame was removed. Then, with a 9 mm distance bar pinched between hot plates, the fibers were hot-pressed and tested in a manner similar to Example 1. The thickness of resulting each layer was 1 mm. Preparation conditions are shown in Tables 1–15 and test results are shown in Table 2.

EXAMPLE 20

After fibers obtained by defibrating fruit portion of coconut palms were cut into a length of 100 mm, 81 g of a 50% aqueous dispersion of a combination of 100 parts of urea-melamine-based adhesive and 1 part of ammonium chloride hardener was dispersed to 445.5 g of the fibers. The fibers were oriented along one direction by using an orienting device which had in combination a drawing part comprising six roller pairs and a comb-like combing part. After that, a 175.5 g portion, which was one of equally divided three portions of the material, was aligned in a single direction within a 300 mm×300 mm frame and laminated. The frame was removed. Afterwards, with a 3 mm distance bar pinched, the fibers were hot-pressed in a manner similar to Example 1, and likewise, three fiberboards with thickness 3 mm were prepared in total. In order that the adhesive amount of two adhesion layers for bonding these three boards together would be 150 g/m$^2$, 27 g of a 50% aqueous dispersion of a combination of 100 parts of urea-melamine-based adhesive and 1 part of ammonium chloride hardener was applied to each of both surfaces of the fiberboard serving as an inner layer. Then the fiberboards were laminated so that the direction of orientation in the fiberboard serving as the inner layer and the direction of orientation in the two fiberboards serving as the surface layers would be vertical to each other. Afterwards, with a 9 mm distance bar pinched between hot plates, the fibers were hot-pressed. The preparation conditions were a press temperature of 160° C., a press pressure of 50 kg/cm$^2$ and a press time of 5 minutes as in Example 1. Preparation conditions are shown in Tables 1–15 and test results are shown in Table 2. In Table 2, the lengthwise direction for the lengthwise rate of change during moisture absorption refers to a direction of orientation in which the fibers were aligned within the surface layers, and the widthwise direction for the widthwise rate of change during moisture absorption refers to a direction perpendicular to the direction of orientation in which the fibers were aligned within the surface layers.

EXAMPLE 21

As a surface layer, after fibers obtained by defibrating oil palm EFB were cut into a length of 100 mm, 18 g of phenol-based powder adhesive was added and dispersed to 198 g of the fibers. Also, as an inner layer, 22.5 g of phenol-based powder adhesive was added and dispersed to 247.5 g of softwood fibers with mean fiber length 2 mm. The oil-palm EFB fibers with the adhesive dispersed were oriented along one direction by using an orienting device which had in combination a drawing part comprising six roller pairs and a comb-like combing part, and then a half amount of the fibers were aligned in a single direction within a 300 mm×300 mm frame, in which process the fibers were laminated so as to differ in height depending on places. On top of this, the softwood fibers with the adhesive dispersed were placed, and their surface was made irregular with pits and projections by a spatula, and further the remaining half of the oil-palm EFB fibers were stretched and aligned in the same direction as with the first half. The frame was removed. Afterwards, with a 9 mm distance bar pinched between hot plates, the fibers were hot-pressed. The preparation conditions were a press temperature of 160° C., a press pressure of 50 kg/cm$^2$ and a press time of 5 minutes. These conditions are shown in Tables 1–15. The appearance of the resulting fiberboards are as shown in FIG. 11, where the boundary surfaces between the surface layers in which the oil-palm EFB fibers are oriented along one direction and the inner layer which is formed of softwood fibers are made irregular with pits and projections.

Also, physical properties of the resulting fiberboard were tested according to the method defined by JIS A5906 (medium density fiberboard) and JIS A1437 (Resistance-to-Moisture B Method in Moisture Resistance Test Method for Building Interior Boards). Test results are shown in Table 2. In Table 2, the lengthwise rate of change during moisture absorption and the widthwise rate of change during moisture absorption are after-7-day lengthwise and widthwise rates of change, respectively, of the fiberboard placed in a thermo-hygrostat set to 40° C. and humidity 90%, where the lengthwise direction is the direction of orientation in which the fibers were aligned within the surface layers and the widthwise direction is a direction perpendicular to the direction of the aligned fibers.

EXAMPLE 22

To 198 g of fibers of oil palm fronds which were defibrated and then cut into a length of 100 mm, 36 g of a 50% aqueous dispersion of a combination of 100 parts of ureamelamine-based adhesive and 1 part of ammonium chloride hardener was dispersed as a binder. Also, to 247.5 g of softwood fibers with mean fiber length 2 mm, 45 g of a 50% aqueous dispersion of a combination of 100 parts of urea-melamine-based adhesive and 1 part of ammonium chloride hardener was dispersed.

Figure 12:
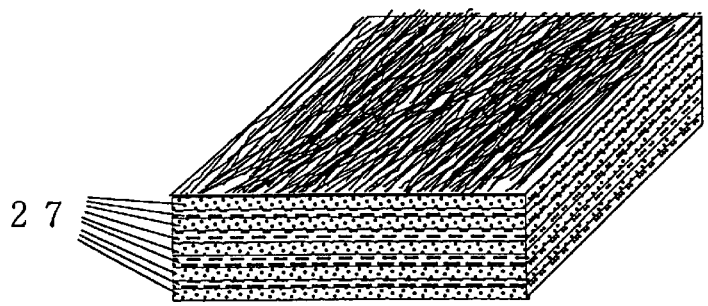
FIG. 12 is a schematic view of a multilayered fiberboard of nine layers in which adjacent layers have perpendicular directions of orientation of fibers.
Figure 13:
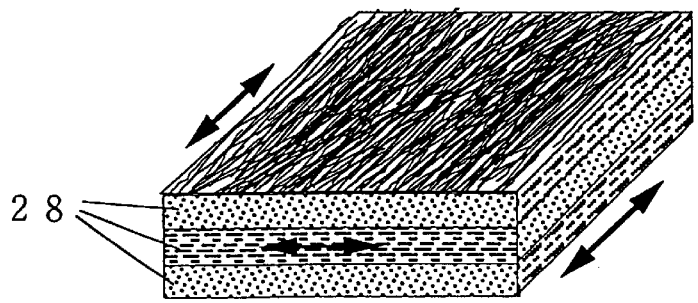
FIG. 13 is a schematic view of a multilayered fiberboard of three layers in which adjacent layers have perpendicular directions of orientation of fibers.

The oil-palm frond fibers with the adhesive dispersed were oriented along one direction by using an orienting device which had in combination a drawing part comprising six roller pairs and a comb-like combing part. After that, an about 1/9 amount of the fibers were aligned in a single direction within a 300 mm×300 mm frame and moreover about 1/9 of the softwood fibers with the binder dispersed were sprinkled into the frame. Subsequently, about 1/9 of the oil-palm frond fibers were stretched and aligned in a direction perpendicular to the direction of the preceding alignment and moreover about 1/9 of the softwood fibers with the binder dispersed were sprinkled into the frame. This step was repeated to nine times, by which the oil-palm frond fibers that had been oriented in perpendicular directions and the softwood fibers were laminated. This fiber stack was hot-pressed in a manner similar to Example 21, by which a fiberboard as shown in FIG. 12 was obtained. Preparation conditions are shown Tables 1–15 and test results are shown in Table 2.

EXAMPLE 23

To 198 g of kenaf fibers which were defibrated and then cut into a length of 100 mm, 36 g of a 50% aqueous dispersion of isocyanate-based adhesive was added and dispersed as a binder. Also, to 247.5 g of softwood fibers with mean fiber length 2 mm, 45 g of a 50% aqueous dispersion of isocyanate-based adhesive was dispersed.

The kenaf fibers with the binder dispersed were oriented along one direction by using an orienting device which had in combination a drawing part comprising six roller pairs and a comb-like combing part. After that, the fibers were bundled into dozens of bundles as they were aligned in direction, by which bundles of kenaf fibers with diameter about 2 mm were prepared. The resulting bundles of kenaf fibers were stretched and aligned in a single direction within a 300 mm×300 mm frame, and moreover the softwood fibers with the binder dispersed were sprinkled thereinto, by which the bundles of kenaf fibers aligned along one direction and the softwood fibers were laminated. The result was hot-pressed in a manner similar to Example 21, by which a fiberboard as shown in FIG. 14 was obtained. Preparation conditions are shown in Tables 1–15 and test results are shown in Table 2.

EXAMPLE 24

As a surface layer, after fibers obtained by defibrating kenaf were cut into a length of 100 mm, 18 g of phenol-based powder adhesive was added and dispersed as a binder to 198 g of the kenaf fibers. Also, as an inner layer, 11.3 g of phenol-based powder adhesive was added and dispersed to 123.8 g of softwood fibers with mean fiber length 2 mm.

The kenaf fibers with the binder dispersed were oriented along one direction by using an orienting device which had in combination a drawing part comprising six roller pairs and a comb-like combing part, and then a half of the fibers were stretched and aligned in a single direction within a 300 mm×300 mm frame, and laminated. The frame was removed. The result was hot-pressed with a 2 mm distance bar pinched as in Example 1, by which two fiberboards in which the kenaf fibers with 2 mm thickness were oriented along one direction were prepared in total. Also, the softwood fibers with the binder dispersed were sprinkled into a 300 mm×300 mm frame and stacked. The frame was removed. The fibers were hot pressed with a 5 mm distance bar pinched between hot plates in a manner similar to Example 17, by which a fiberboard with thickness 5 mm was prepared. In order that the adhesive amount of two adhesion layers for bonding these three boards together would be 150 g/m$^2$, 27 g of a 50% aqueous dispersion of a combination of 100 parts of urea-melamine-based adhesive and 1 part of ammonium chloride hardener was applied to each of both surfaces of the softwood fiberboard serving as an inner layer. Then the fiberboards were laminated so that the direction of orientation in the two fiberboards serving as the surface layers would be parallel to each other. Afterwards, with a 9 mm distance bar pinched between hot plates, the fibers were hot-pressed, by which a fiberboard having a surface layer thickness of 2 mm and an inner layer thickness of 5 mm as shown in FIG. 2 was obtained. The density of the surface layers was about 0.6 g/cm$^3$ and the density of the inner layer in the interior was about 0.3 g/cm$^3$, and thus a fiberboard having an overall density of about 0.43 g/cm$^3$ was obtained. Preparation conditions are shown in Tables 1–15 and test results are shown in Table 2.

EXAMPLE 25

As a surface layer, after fibers obtained by defibrating oil palm EFB were cut into a length of 100 mm, 15 g of a 50% aqueous dispersion of isocyanate-based adhesive was added and dispersed to 165 g of the fibers. Also, as an inner layer, 21 g of phenol-based powder adhesive was dispersed to 231 g of oil palm EFB short fibers whose mean fiber length was made into about 2 mm by a cutting mill.

The oil-palm EFB fibers with the adhesive dispersed were oriented along one direction by using an orienting device which had in combination a drawing part comprising six roller pairs and a comb-like combing part. Then, a half of the fibers were stretched and aligned in one direction as well as in a direction perpendicular to the one direction within a 300 mm×300 mm frame, and thereafter formed into a mat shape with a pressure applied from above and below at room temperature. By similar process, two mats with thickness about 1 mm were prepared. After one mat of oil-palm EFB long fibers thus prepared was set within the frame, the oil-palm short fibers with the adhesive dispersed were sprinkled, and further the one more oil-palm EFB long fibers was set. The frame was removed. Afterwards, with a 9 mm distance bar pinched between hot plates, the fibers were hot-pressed and tested in a manner similar to Example 21. The resulting thickness of the surface layers was 1 mm and the resulting thickness of the inner layer was 7 mm. The density of the surface layers was about 1.0 g/cm$^3$ and the density of the inner layer in the interior was about 0.4 g/cm$^3$, and thus a fiberboard having an overall density of about 0.53 g/cm$^3$ was obtained. Preparation conditions are shown in Tables 1–15 and test results are shown in Table 2.

COMPARATIVE EXAMPLE 1

To 445.5 g of softwood fibers with mean fiber length 2 mm, 40.5 g of phenol-based powder adhesive was added and dispersed. These fibers were stacked in a 300 mm×300 mm frame. After the frame was removed, the fibers were hot-pressed with a 9 mm distance bar pinched between hot plates and tested in a manner similar to Example 1. Preparation conditions are shown in Tables 1–15 and test results are shown in Table 2.

COMPARATIVE EXAMPLE 2

To 445.5 g of softwood fibers with mean fiber length 2 mm, 81 g of a 50% aqueous dispersion of isocyanate-based adhesive was added and dispersed. These fibers were stacked in a 300 mm×300 mm frame. After the frame was removed, the fibers were hot-pressed with a 9 mm distance bar pinched between hot plates and tested in a manner similar to Example 1. Preparation conditions are shown in Tables 1–15 and test results are shown in Table 2.

COMPARATIVE EXAMPLE 3

To 594.0 g of softwood fibers with mean fiber length 2 mm, 54.0 g of phenol-based powder adhesive was added and dispersed. These fibers were stacked in a 300 mm×300 mm frame. After the frame was removed, the fibers were hot-pressed with a 9 mm distance bar pinched between hot plates and tested in a manner similar to Example 1. Preparation conditions are shown in Tables 1–15 and test results are shown in Table 2.

COMPARATIVE EXAMPLE 4

A phenol-reinforced rock wool board (product name: Tough Flex Board having a size of 300 mm×300 mm×9 mm thick, a 0.40 g/cm$^3$ density and a 324 g weight was taken as Comparative Example 4 and tested. Preparation conditions are shown in Tables 1–15 and test results are shown in Table 2.

COMPARATIVE EXAMPLE 5

To 445.5 g of oil palm EFB short fibers whose mean fiber length was made into about 2 mm by cutting the oil-palm EFB with a cutting mill, 81 g of a 50% aqueous dispersion of isocyanate-based adhesive was added and dispersed. The fibers were stacked within a 300 mm×300 mm frame. After the frame was removed, the fibers were hot-pressed with a 9 mm distance bar pinched between hot plates and tested in a manner similar to Example 1. Preparation conditions are shown in Tables 1–15 and test results are shown in Table 2.

TABLE 1-1

|  | Composition form | Material of long-fiber lignocellulose | Fiber length (mm) | Weight (g) | — | Direction of orientation |
|---|---|---|---|---|---|---|
| Example 1 | Hot-pressing only long fibers | oil palm EFB | 100 | 445.5 | — | — |
| Example 2 | Hot-pressing only long fibers | Fruit portion of coconut palms | 100 | 445.5 | — | — |
| Example 3 | Hot-pressing only long fibers | oil palm EFB | 10 | 445.5 | — | — |
| Example 4 | Mixing and hot-pressing long fibers and short fibers | oil palm fronds | 100 | 198.0 | — | — |
| Example 5 | Aligning long fibers along one direction and hot-pressing | oil palm EFB | 100 | 445.5 | — | Single direction |
| Example 6 | Aligning long fibers along one direction and hot-pressing | Kenaf | 150 | 594.0 | — | Single direction |
| Example 7 | Orienting long fibers in perpendicular directions and hot-pressing | oil palm EFB | 10 | 594.0 | — | Perpendicular directions |
| Example 8 | Orienting long fibers in perpendicular directions and hot-pressing | Kenaf | 100 | 445.5 | — | Perpendicular directions |
| Example 9 | Twining and hot-pressing long fibers | oil palm EFB | 100 | 445.5 | — | Twining |

TABLE 1-2

|  | Composition form | Material of long-fiber lignocellulose of surface layer | Fiber length (mm) | Weight (g) | Thickness of surface layer | Direction of orientation of surface layer |
|---|---|---|---|---|---|---|
| Example 10 | Laminating surface layer and inner layer | Fruit portion of coconut palms | 100 | 198.0 | 2 mm | — |
| Example 11 | Laminating surface layer and inner layer | oil palm EFB | 100 | 198.0 | 2 mm | — |
| Example 12 | Laminating surface layer in which long fibers are oriented along one direction and inner layer | oil palm fronds | 100 | 198.0 | 2 mm | Single direction |
| Example 13 | Laminating surface layer in which long fibers are oriented along one direction and inner layer | Kenaf | 150 | 264.0 | 2 mm | Single direction |

TABLE 1-2-continued

|  | Composition form | Material of long-fiber lignocellulose of surface layer | Fiber length (mm) | Weight (g) | Thickness of surface layer | Direction of orientation of surface layer |
|---|---|---|---|---|---|---|
| Example 14 | Laminating surface layer in which long fibers are oriented in perpendicular directions and inner layer | Fruit portion of coconut palms | 10 | 264.0 | 2 mm | Perpendicular directions |
| Example 15 |  | Kenaf | 100 | 198.0 | 2 mm | Perpendicular directions |
| Example 16 | Laminating twined surface layer and inner layer | oil palm EFB | 100 | 198.0 | 2 mm | Twining |
| Example 17 | Laminating surface layer and inorganic fiberboard | Kenaf | 100 | 198.0 | 2 mm | Perpendicular directions |

TABLE 1-3

|  | Composition form | Material of long-fiber lignocellulose of surface layer | Fiber length (mm) | Weight (g) | Thickness of surface layer | Number of layer |
|---|---|---|---|---|---|---|
| Example 18 | Laminating layers in which long fibers are oriented along one direction, so that adjacent layers have perpendicular directions of orientation | oil palm fronds | 100 | 445.5 | 1 mm | 9 layers |
| Example 19 |  | Kenaf | 100 | 445.5 | 1 mm | 9 layers |
| Example 20 |  | Fruit portion of coconut palms | 100 | 445.5 | 3 mm | 3 layers |

TABLE 1-4

|  | Composition form | Material of long fiber | Fiber length (mm) | Weight (g) | Thickness of surface layer | Direction of orientation of long fibers |
|---|---|---|---|---|---|---|
| Example 21 | Laminating so that boundary surface has pits and projections | oil palm EFB | 100 | 198.0 | — | Single direction |
| Example 22 | Compositing bundles of long fibers into a continuous phase | oil palm fronds | 100 | 198.0 | — | Perpendicular directions |
| Example 23 |  | Kenaf | 100 | 198.0 | — | Single direction |
| Example 24 | Laminating so that surface layer and inner layer differ in density from each other | Kenaf | 100 | 198.0 | 2 mm | Single direction |
| Example 25 |  | oil palm EFB | 100 | 165.0 | 1 mm | Perpendicular directions |

TABLE 1-5

|  | Composition form | Material | Fiber length (mm) | Weight (g) | — | ... |
|---|---|---|---|---|---|---|
| Comparative Example 1 | Hot-pressing only short fibers | Softwood fibers | 2 | 445.5 | — | — |
| Comparative Example 2 | Hot-pressing only short fibers | Softwood fibers | 2 | 445.5 | — | — |
| Comparative Example 3 | Hot-pressing only short fibers | Softwood fibers | 2 | 594.0 | — | — |
| Comparative Example 4 | — | Phenol-reinforced rock wool board | — | 324.0 | — |  |

TABLE 1-5-continued

|  | Composition form | Material | Fiber length (mm) | Weight (g) | — | ... |
|---|---|---|---|---|---|---|
| Comparative Example 5 | Hot-pressing only short fibers | oil palm EFB | 2 | 445.5 | — | — |

Board size: 300 × 300 × 9

TABLE 1-6

|  | Material of mixed fibers | Fiber length (mm) | Weight (g) | — | — | Type of adhesive |
|---|---|---|---|---|---|---|
| Example 1 | — | — | — | — | — | Phenol based |
| Example 2 | — | — | — | — | — | Isocyanate based |
| Example 3 | — | — | — | — | — | Urea-melamine based |
| Example 4 | Softwood fibers | 2 | 247.5 | — | — | Urea-melamine based |
| Example 5 | — | — | — | — | — | Phenol based |
| Example 6 | — | — | — | — | — | Isocyanate based |
| Example 7 | — | — | — | — | — | Phenol based |
| Example 8 | — | — | — | — | — | Isocyanate based |
| Example 9 | — | — | — | — | — | Urea-melamine based |

TABLE 1-7

|  | Material of inner layer | Fiber length (mm) | Weight (g) | Thickness of inner layer | Hot-pressing method | Type of adhesive |
|---|---|---|---|---|---|---|
| Example 10 | Mixing at the same ratio as in Example 4 |  | 247.5 | 5 mm | Hot-pressing after lamination | Isocyanate based |
| Example 11 | Softwood fibers | 2 | 247.5 | 5 mm | Hot-pressing after lamination | Phenol based |
| Example 12 | Softwood fibers | 2 | 247.5 | 5 mm | Hot-pressing after lamination | Urea-melamine based |
| Example 13 | Oil palm EFB short fibers | 2 | 330.0 | 5 mm | Hot-pressing after lamination | Phenol based |
| Example 14 | Oil palm EFB short fibers | 2 | 330.0 | 5 mm | Hot-pressing after lamination | Isocyanate based |
| Example 15 | Softwood fibers | 2 | 247.5 | 5 mm | Hot-pressing after lamination | Isocyanate based |
| Example 16 | Softwood fibers | 2 | 247.5 | 5 mm | Hot-pressing after lamination | Urea-melamine based |
| Example 17 | Phenol-reinforced rock wool board | — | 180.0 | 5 mm | Hot-pressing after lamination | Phenol based |

TABLE 1-8

|  | ... | — | — | — | Hot-pressing method | Type of adhesive |
|---|---|---|---|---|---|---|
| Example 18 | — | — | — | — | Hot-pressing after lamination | Phenol based |
| Example 19 | — | — | — | — | Hot-pressing after lamination | Isocyanate based |
| Example 20 | — | — | — | — | Lamination and adhesion after hot-pressing | Urea-melamine based |

TABLE 1-9

|  | Material to be composited with long fibers | Fiber length (mm) | Weight (g) | Thickness of inner layer | Hot-pressing method | Type of adhesive |
| --- | --- | --- | --- | --- | --- | --- |
| Example 21 | Softwood fibers | 2 | 247.5 | — | Hot-pressing after lamination | Phenol based |
| Example 22 | Softwood fibers | 2 | 247.5 | — | Hot-pressing after lamination | Urea-melamine based |
| Example 23 | Softwood fibers | 2 | 247.5 | — | Hot-pressing after lamination | Isocyanate based |
| Example 24 | Softwood fibers | 2 | 123.8 | 5 mm | Lamination and adhesion after hot-pressing | Phenol based |
| Example 25 | Oil palm EFB short fibers | 2 | 231.0 | 7 mm | Hot-pressing after lamination | Isocyanate based + Phenol based |

TABLE 10

|  | — | — | — | — | — | Type of adhesive |
| --- | --- | --- | --- | --- | --- | --- |
| Comparative Example 1 | — | — | — | — | — | Phenol based |
| Comparative Example 2 | — | — | — | — | — | Isocyanate based |
| Comparative Example 3 | — | — | — | — | — | Phenol based |
| Comparative Example 4 | — | — | — | — | — | — |
| Comparative Example 5 | — | — | — | — | — | Isocyanate based |

TABLE 1–11

|  | Amount of adhesive (solid content) g | Press temperature (° can) | Press pressure (kg/cm$^2$) | Press time (min.) |
| --- | --- | --- | --- | --- |
| Example 1 | 40.5 | 160 | 50 | 5 |
| Example 2 | 40.5 | 160 | 50 | 5 |
| Example 3 | 54.0 | 160 | 50 | 5 |
| Example 4 | 40.5 | 160 | 50 | 5 |
| Example 5 | 40.5 | 160 | 50 | 5 |
| Example 6 | 54.0 | 160 | 50 | 5 |
| Example 7 | 54.0 | 160 | 50 | 5 |
| Example 8 | 40.5 | 160 | 50 | 5 |
| Example 9 | 40.5 | 160 | 50 | 5 |

TABLE 1–12

|  | Amount of adhesive (solid content) g | Press temperature (° C.) | Press pressure (kg/cm$^2$) | Press time (min.) |
| --- | --- | --- | --- | --- |
| Example 10 | 40.5 | 160 | 50 | 5 |
| Example 11 | 40.5 | 160 | 50 | 5 |
| Example 12 | 40.5 | 160 | 50 | 5 |
| Example 13 | 54.0 | 160 | 50 | 5 |
| Example 14 | 54.0 | 160 | 50 | 5 |
| Example 15 | 40.5 | 160 | 50 | 5 |
| Example 16 | 40.5 | 160 | 50 | 5 |
| Example 17 | 18.0 | 160 | 50 | 5 |

TABLE 1–13

|  | Amount of adhesive (solid content) g | Press temperature (° C.) | Press pressure (kg/cm$^2$) | Press time (min.) |
| --- | --- | --- | --- | --- |
| Example 18 | 40.5 | 160 | 50 | 5 |
| Example 19 | 40.5 | 160 | 50 | 5 |
| Example 20 | 57.5 | 160 | 50 | 5 |

TABLE 1–14

|  | Amount of adhesive (solid content) g | Press temperature (° C.) | Press pressure (kg/cm$^2$) | Press time (min.) |
| --- | --- | --- | --- | --- |
| Example 21 | 40.5 | 160 | 50 | 5 |
| Example 22 | 40.5 | 160 | 50 | 5 |
| Example 23 | 40.5 | 160 | 50 | 5 |
| Example 24 | 40.5 | 160 | 50 | 5 |
| Example 25 | 40.5 | 160 | 50 | 5 |

TABLE 1–15

|  | Amount of adhesive (solid content) g | Press temperature (° C.) | Press pressure (kg/cm$^2$) | Press time (min.) |
| --- | --- | --- | --- | --- |
| Comparative Example 1 | 40.5 | 160 | 50 | 5 |
| Comparative Example 2 | 40.5 | 160 | 50 | 5 |
| Comparative Example 3 | 54.0 | 160 | 50 | 5 |
| Comparative Example 4 | — | — | — | — |
| Comparative Example 5 | 40.5 | 160 | 60 | 5 |

TABLE 2

| | Thickness (mm) | Density (g/cm³) | Mean bending strength (kgf/cm²) | Mean bending Young's modulus (10³kgf/cm²) | Lengthwise rate of change during moisture absorption (%) | Widthwise rate of change during moisture absorption (%) | Thickness-wise rate of expansion (%) |
|---|---|---|---|---|---|---|---|
| Example 1 | 8.95 | 0.62 | 220 | 2.7 | 0.4 | 0.4 | — |
| Example 2 | 9.02 | 0.60 | 230 | 2.9 | 0.4 | 0.4 | — |
| Example 3 | 9.01 | 0.63 | 245 | 3.0 | 0.4 | 0.4 | — |
| Example 4 | 9.01 | 0.60 | 230 | 2.9 | 0.4 | 0.4 | — |
| Example 5 | 9.10 | 0.61 | 305 | 3.8 | 0.2 | 0.4 | — |
| Example 6 | 9.00 | 0.76 | 620 | 10.3 | 0.2 | 0.4 | — |
| Example 7 | 9.09 | 0.82 | 350 | 4.5 | 0.3 | 0.3 | — |
| Example 8 | 9.06 | 0.59 | 300 | 5.2 | 0.3 | 0.3 | — |
| Example 9 | 9.12 | 0.59 | 280 | 3.5 | 0.3 | 0.3 | — |
| Example 10 | 9.05 | 0.59 | 230 | 2.8 | 0.4 | 0.4 | — |
| Example 11 | 9.05 | 0.62 | 220 | 2.7 | 0.4 | 0.4 | — |
| Example 12 | 9.08 | 0.60 | 265 | 3.3 | 0.3 | 0.4 | — |
| Example 13 | 9.00 | 0.78 | 510 | 7.0 | 0.3 | 0.4 | — |
| Example 14 | 8.96 | 0.83 | 305 | 5.4 | 0.3 | 0.3 | — |
| Example 15 | 9.11 | 0.60 | 260 | 4.2 | 0.3 | 0.3 | — |
| Example 16 | 9.04 | 0.62 | 250 | 3.1 | 0.3 | 0.3 | — |
| Example 17 | 9.05 | 0.48 | 110 | 1.1 | 0.0 | 0.0 | — |
| Example 18 | 9.06 | 0.59 | 280 | 3.5 | 0.3 | 0.3 | — |
| Example 19 | 9.01 | 0.61 | 290 | 5.0 | 0.3 | 0.3 | — |
| Example 20 | 9.03 | 0.65 | 275 | 3.4 | 0.3 | 0.3 | — |
| Example 21 | 9.05 | 0.61 | 280 | 4.0 | 0.3 | 0.4 | — |
| Example 22 | 9.01 | 0.60 | 245 | 3.0 | 0.3 | 0.3 | — |
| Example 23 | 9.03 | 0.60 | 270 | 2.8 | 0.2 | 0.4 | — |
| Example 24 | 9.06 | 0.43 | 230 | 3.2 | 0.2 | 0.3 | 6.5 |
| Example 25 | 9.05 | 0.53 | 265 | 4.7 | 0.2 | 0.2 | 7.0 |
| Comparative Example 1 | 8.96 | 0.61 | 105 | 1.2 | 0.4 | 0.4 | 12.0 |
| Comparative Example 2 | 9.01 | 0.60 | 110 | 1.3 | 0.4 | 0.4 | 15.0 |
| Comparative Example 3 | 8.98 | 0.83 | 205 | 2.5 | 0.7 | 0.7 | — |
| Comparative Example 4 | 9.02 | 0.40 | 29 | 0.3 | 0.0 | 0.0 | — |
| Comparative Example 5 | 9.00 | 0.60 | 95 | 1.0 | 0.4 | 0.4 | 15.0 |

As shown in Table 2, the fiberboards of Examples 1, 2, 4 to 5, 8 to 12, 15, 16 and 18 to 23 are improved in strength in spite of being generally equal in density, as compared with the fiberboards of Comparative Examples 1 and 2. An extremely large effect is produced particularly when fibers are oriented and when fibers are laminated. Also, when fibers are oriented, the rate of dimensional change in the direction of orientation of fibers is reduced.

The fiberboards of Examples 6, 7, 13 and 14 are improved in strength in spite of being generally equal in density, as compared with the fiberboard of Comparative Example 3. An extremely large effect is produced particularly when fibers are oriented and when fibers are laminated. Also, when fibers are oriented, the rate of dimensional change in the direction of orientation of fibers is reduced.

The fiberboard of Example 17 is extremely improved in strength by virtue of the reinforcement by orientation of fibers, as compared with Comparative Example 4.

The fiberboards of Examples 24 and 25 are characterized by low density and light weight and reduced in the rate of dimensional change in the direction of orientation of fibers, as compared with Comparative Examples 1 and 2. Furthermore, the rate of expansion in the thickness direction is also greatly reduced by lowered density of the inner layer.

Thus, it has been confirmed that the fiberboards produced by hot-pressing lignocellulose long fibers according to the present invention are superior in strength. Also, the fiberboards in which lignocellulose long fibers are oriented and laminated are improved remarkably in strength and also improved in dimensional stability during water absorption or moisture absorption.

What is claimed is:

1. A fiberboard, comprised of lignocellulose long fibers obtained from oil palms, coconut palms, or kenaf and a resin, wherein the lignocellulose long fibers are formed by defibration, and have a fiber length of 50 mm or more, said lignocellulose long fibers are oriented in one direction or oriented in two directions generally perpendicular to each other, and the oriented fibers are intertwined.

2. The fiberboard according to claim 1, further comprising lignocellulose short fibers having a fiber length of 6 mm or less.

3. The fiberboard according to claim 1, wherein the fiberboard is a multilayered fiberboard, and at least one layer is formed of said lignocellulose long fibers.

4. The fiberboard according to claim 1, wherein an inorganic fiberboard is further laminated.

5. The fiberboard according to claim 3, wherein a boundary surface between a surface layer and its adjacent layer is a curved surface.

6. The fiberboard according to claim 3, wherein a plurality of layers in which lignocellulose long fibers are oriented along one direction are laminated, and directions of orientation of fibers of each one layer and its adjacent layer are crossing each other.

7. The fiberboard according to claim 1 or 3, wherein the density of the central part of the fiberboard is lower than the density of vicinities of surfaces of the fiberboard.

8. The fiberboard according to claim 1, wherein fiber bundles in which lignocellulose long fibers are oriented along one direction are arranged inside the fiberboard.

9. A method for manufacturing the fiberboard of claim 3, comprising the steps of:

laminating layers, applying heat, pressure or a mixture thereof to the laminated layers to form a fiberboard.

10. A method for manufacturing the fiberboard of claim 3, comprising the steps of:

applying heat, pressure or a mixture thereof to the laminated layers to form a separately board-made layer, and laminating the separately board-made layers by means of adhesion to form a fiberboard.

* * * * *